May 5, 1964     S. YANDO     3,131,608

SERVOMECHANISM

Filed Oct. 25, 1961     2 Sheets-Sheet 1

HIGH PRESSURE FLUID →

LOW PRESSURE FLUID ←

INPUT SIGNAL

INVENTOR
STEPHEN YANDO

BY *Theodore Jn.*

ATTORNEY

HIGH PRESSURE FLUID  LOW PRESSURE FLUID

HIGH PRESSURE FLUID  LOW PRESSURE FLUID

INVENTOR
STEPHEN YANDO
BY
ATTORNEY

United States Patent Office 3,131,608
Patented May 5, 1964

3,131,608
SERVOMECHANISM
Stephen Yando, 8 Green Meadow Lane,
Huntington, Long Island, N.Y.
Filed Oct. 25, 1961, Ser. No. 147,684
6 Claims. (Cl. 91—387)

My invention relates to servomechanisms or servos.

In my Patent 2,930,360, I disclosed a new type of servo, for example, a hydraulic servo, wherein, in response to an input signal such as an electrical control signal, a piston is moved by fluid pressure in one of two opposite directions from a neutral position to a controlled position uniquely determined by the instantaneous value and polarity of the signal. More particularly, the signal operates the control valve which in turn controls the action of fluid pressure on the piston. As in all servos, a feedback signal must be developed to act in opposite sense to the control signal. To this end both the valve and the piston carry separate field producing means such as magnets which interact to produce the feedback.

I have invented a new type of servo which functions in the same manner as indicated above and yet produces the required signal without the use of magnets. My new servo is characterized, in addition, by less constructional complexity and can be produced at significantly less expense. Morever, as explained hereinafter my new servo is much less sensitive to unbalanced pressures which adversely affect servo operation.

A servomechanism in accordance with my invention comprises an output member adapted for movement to and fro about a neutral position and a control member also adapted for movement to and fro about a neutral position. It further comprises first means to apply small displacing forces to the control member to shift same from the neutral position and second means connected between the two members to exert a force therebetween which acts in opposition to said displacing forces. An external source of energy responds to the displacement of the control member by said displacing forces to apply power to the output members. The construction and arrangement is such that in the absence of said displacing forces, both members are held in neutral positions, but in the presence of such forces, the output member will be operated powerfully in the direction opposite to that of said displacing forces until the output member has been moved to a position characteristic of the magnitude of the displacing forces. With the output member in this position, the second means will have supplied a net feedback force to the control member to return said control member to its neutral position against the resistance of the displacing forces.

An illustrative embodiment of my invention will now be described with reference to the accompanying drawings wherein.

Figure 1:
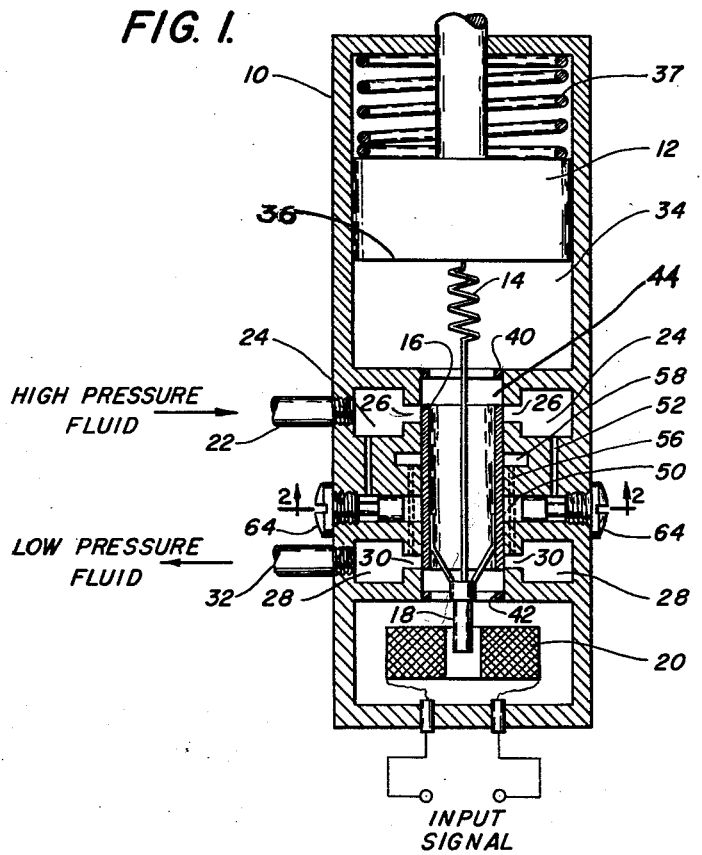
FIG. 1 is a cut away side view of a servo in accordance with my invention.

Referring now to FIG. 1, there is shown a cylindrical housing 10 containing an output piston 12. A spring 14, designated as a feedback spring for reasons to be described below, connects piston 12 to a control valve 16. A soft iron magnetic armature 18 secured to valve 16 is positioned within a control coil 20. High pressure hydraulic fluid is supplied through an inlet conduit 22 to a first annular chamber 24 within housing 10. Chamber 24 has an internal port 26. Fluid at low pressure can enter a second annular chamber 28 in the housing by means of a second internal port 30 and be discharged from chamber 28 through outlet conduit 32.

In FIG. 1, both piston 12 and valve 16 are shown in neutral positions. This situation ensues with a small bias current flowing in the control coil 20. The magnetic field produced by this current exerts a force on the armature 18 which is equal and opposite to that exerted by the feedback spring 14, thus holding the valve 16 and piston 12 in their neutral positions. Under these conditions, internal ports 26 and 30 are closed.

If the control current is increased somewhat in value, the magnetic force on armature 18 is increased and valve 16 is moved downward along the axis of housing 10. This movement opens internal port 26 and high pressure fluid flows from chamber 24 into region 34 of the housing. At this point the high pressure fluid exerts a force on the front face 36 of the output piston 12 which exceeds the reverse acting force exerted on piston 12 by return spring 37, thus causing the piston to move upward along the axis of the housing. This action stretches or increases the tension in the feedback spring 14 and thus causes the spring to exert an increased force of attraction between the piston 12 and valve 16. [The spring tension varies directly with the linear stretching of the spring.] This action continues until the force of attraction slightly exceeds the magnetic force exerted on the armature 18. At this point, vlave 16 will be moved upward, closing port 26. This action prevents further motion of piston 12. The piston is then arrested above the neutral position uniquely determined by the increase in control current. The piston is moved powerfully to this position and a mechanical load (not shown) is shifted in position accordingly.

If the control current is decreased, the magnetic force on armature 18 decreases. The feedback force exerted by spring 20 then causes valve 16 to be moved up, opening internal port 30, and exposing the front face 36 of output piston 12 to the low pressure fluid in the hydraulic return system. At this point, the force of the return spring 37 on piston 12 exceeds that exerted by the low pressure fluid, and the piston 12 moves downward along the axis of the housing. As piston 12 moves downward, the force of attraction exerted by spring 20 on valve 16 decreases (i.e. the spring tension is reduced). When the force exerted by spring 20 becomes slightly less than the magnetic force exerted on the armature, valve 16 will move downward and close port 30. This arrests further motion of the piston 12, the new piston position being determined by the new value of the control current. Circular stops 40 and 42 limit the motion of valve 16.

It should be noted at this point that the servo can be of extremely small size. For example, the housing 10 can be 6 inches long and 1½ inches in diameter. The valve 16 can move back and forth in a very short stroke, for example .01 inch can be a maximum left or right displacement from the neutral position.

In the arrangement shown in FIG. 1, spring 14 is always extended beyond its free unstressed length whereby the feedback force exerted by the spring is always a force of attraction. When the direction of the control current and bias current is reversed, and the spring described above is replaced by a spring which is always compressed whereby the spring can never be extended to its free unstressed length, the movement of the control valve will be opposite to that described above and the feedback force exerted by the spring will always be a force of repulsion. However, the piston operation will not be changed from that described above.

Figure 4:
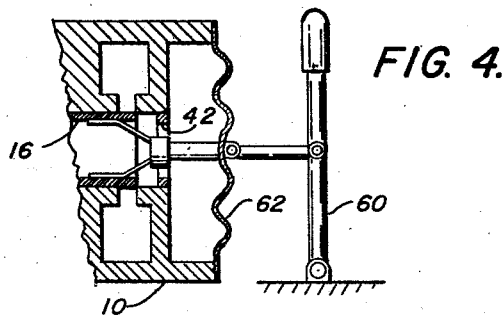
FIG. 4 shows a modification of the servo of FIG. 1 wherein mechanical forces rather than an electrical signal are used to control the servo.

It is not necessary to use an electrical signal to vary the position of the control valve. As shown in FIG. 4, the control coil of FIG. 1 can be replaced by mechanical linkages connected directly through diaphragm 62 to the control valve. The arrangement of FIG. 4 can be used for example to move relatively massive members, such as the rudder of a large airplane travelling at high speeds by finger tip pressure on a control lever 60.

In the arrangement shown in FIG. 1, the front face 36 of piston 12 is exposed either to high or lower pressure fluid, and the vector sum of this force and the reverse acting force on the piston exerted by the return spring 36 determines the direction of travel of the piston. Alternatively, as shown in my Patent 2,930,360, spring 37 need not be used, and high pressure fluid can be ported either to the front face 36 or the rear face 39 of the piston to move it in either direction.

In the servomechanisms thus far described, valve 16 moves back and forth in housing 10 within bore 44 and is out of contact with the bore walls. Pressure imbalance however can occasionally force the valve 16 into contact with the bore wall and thus cause the valve to bind or stick in place. This action can limit the positional accuracy obtainable in the servo.

To positively prevent such binding or sticking, I provide three or four equidistantly separated wells 50. High pressure fluid is supplied through vents 52 in the housing and plug members 64. These members reduce the pressure applied to each well. Low pressure fluid is supplied from chamber 28 through two tubes 56 bored in the housing 10 to an annular leakage chamber 58.

Figure 2:
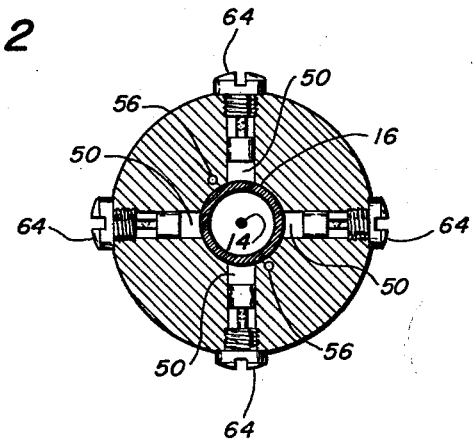
FIG. 2 is a cross sectional view of the servo of FIG. 1 taken along the line 2—2 in FIG. 1.

Because of the arrangement shown, the valve is subjected to symmetrically disposed radial pressures which are some fraction, for example ½, of the high pressure of the fluid. Should the valve be moved in such a manner as to tend to cause binding, a pressure imbalance will be produced which will eliminate this tendency to bind. For example, if in FIG. 2, the valve 16 were to move downward toward the bottom well 50, the decreased clearance would increase the radial pressure applied to the valve at this well. In addition, the increased clearance at the top well 50 thus produced would produce a decrease in the radial pressure applied to the valve at this well. The resulting pressure imbalance would then cause the valve to move upward to its normal position.

Alternatively, other techniques can be used to prevent binding. For example, when an electrical input signal is employed, a relatively high frequency signal component can be superimposed on the control signal to produce a very small continuous vibration (back and forth) or "jitter" of the valve. This jitter will not affect the servo operation but will insure against sticking or binding.

In the servo operation as described above, the ports 26 and 30 are not opened or closed instantaneously; i.e. as the valve 16 moves up or down, the exposed area of the appropriate port through which fluid pressure is applied is smoothly varied from zero (when the port is fully closed) to a maximum value (when the port is fully opened). As a result, the rate of mass flow of the fluid, which varies with the port area, also does not reach its final value (i.e. the value determined by the fully open port) instantaneously.

Figure 3A:
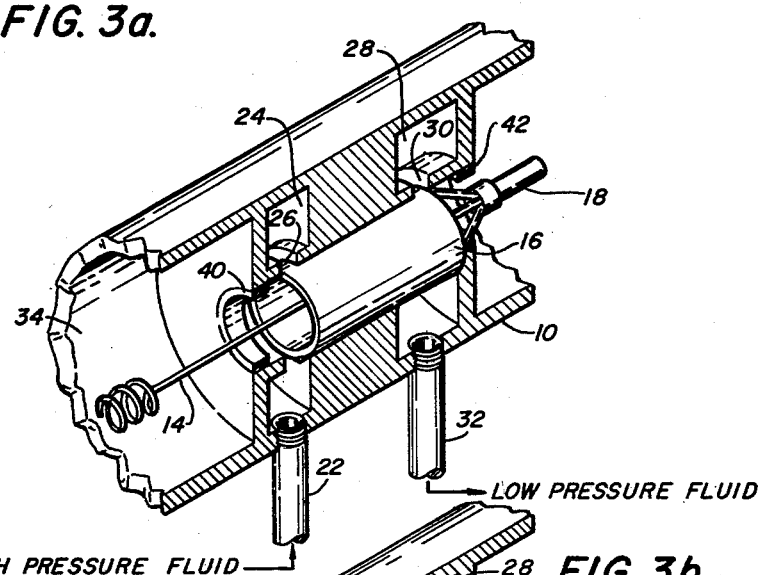
FIGS. 3a and 3b are perspective views of various valve orifices that can be utilized in the servo of FIG. 1.

When the valve has a square edge, as shown in FIG. 3a, the exposed port area increases linearly with valve movement; i.e. the area is proportional to $x$ where $x$ is the linear displacement of the valve.

Figure 3B:
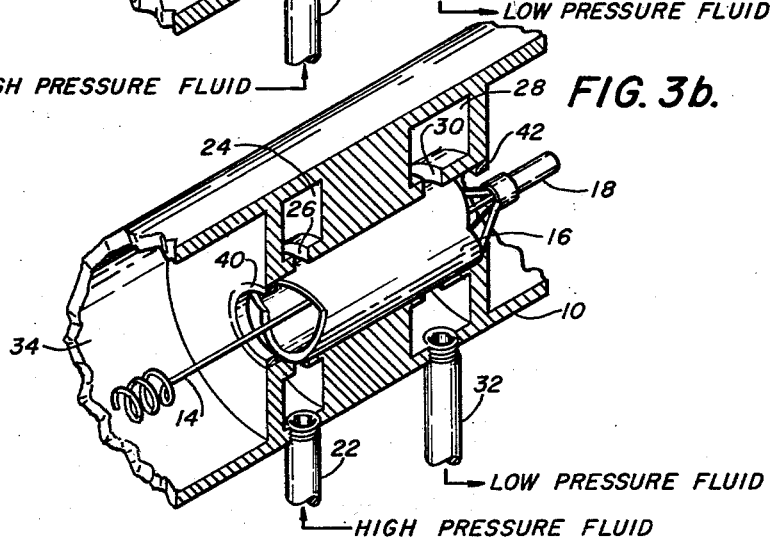

By changing the shape of the edge of the valve, the exposed area can be increased in a non-linear manner as the linear displacement of the valve increases. For example, with the configuration of FIG. 3b, which is elliptical, the area can be approximately proportional to some power of $x$ rather than $x$ as in FIG. 3a.

For many purposes, the construction of FIG. 3a is extremely useful. However, the speed of response of the servo in reacting to changes in the input signal is dependent upon the rate of increase of mass flow of the fluid from zero to its maximum value. This rate of increase in turn is dependent upon the rate of increase in exposure of port area. Consequently, the greater the non-linear increase afforded by an arrangement such as FIG. 3b, the better the performance of the servo. Hence when very high servo response speeds are required, the construction of FIG. 3b or other non-linear arrangements should be used.

While I have shown and pointed out my invention as applied above, it will be apparent to those skilled in the art that many modifications can be made within the scope and sphere of my invention.

What is claimed is:
1. A servomechanism comprising
   (a) a casing having a chamber divided into first and second permanently interconnected sections;
   (b) an output member positioned in said first section and adapted for movement to and fro about a neutral position;
   (c) a control member positioned in said second section and adapted for movement to and fro about a neutral position;
   (d) first means to apply small displacing forces to the control member to shift same from its neutral position;
   (e) second means positioned in both sections and mechanically connected directly between said members to exert a force therebetween which acts in opposition to said displacing forces; and
   (f) an external source of energy responsive to the displacement of the control member by the displacing forces to apply power to the output member, the construction and arrangement being such that in the absence of displacing forces both members are held in neutral positions while in the presence of displacing forces, the output member will be operated powerfully in a direction opposite to that of the displacing forces until the output member attains a position characteristic of the magnitude of the displacing forces and the second means supplies a net feedback force to the control member to return the control member to its neutral position.

2. A servomechanism as set forth in claim 1 wherein said first means is responsive to an electrical input signal variable in amplitude.

3. A servomechanism as set forth in claim 1 wherein said first means is responsive to forces produced by a mechanical linkage.

4. In a servomechanism having a cylindrical housing provided with a chamber having first and second permanently interconnected sections
   (a) an output piston positioned in said first section and adapted for movement from a neutral position in either one of first and second opposed directions along the axis of said housing;
   (b) a control valve displaced from said piston and adapted for movement from a neutral position in either one of said directions along said axis, said valve being positioned in said second section;
   (c) first means to apply small displacing forces to said control valve to move said valve from said neutral position;
   (d) second means positioned in both sections and directly connected mechanically between said piston and said valve to exert a force therebetween which acts in opposition to said displacing forces;
   (e) third means responsive to the movement of said valve to exert a force which moves said piston powerfully in a direction opposite to that of said displacing forces until the piston has been moved to a position characteristic of the magnitude of said displacing forces and said second means has exerted such force upon the valve as to return same to its neutral position; and
   (f) fourth means to prevent said valve from binding during movement in said housing.

5. A servomechanism as set forth in claim 4 wherein said fourth means applies symmetrically disposed radial compressive fluid forces to said valve.

6. A servomechanism as set forth in claim 4 wherein said first means is responsive to an electrical input signal variable in amplitude and wherein said fourth means applies an electrical signal component to said first means to produce a very small continuous back and forth vibration of said valve.

References Cited in the file of this patent
UNITED STATES PATENTS

| | | |
|---|---|---|
| 2,462,580 | Watson | Feb. 22, 1949 |
| 2,966,891 | Williams | Jan. 3, 1961 |
| 3,012,575 | Woody et al. | Dec. 12, 1961 |